United States Patent [19]

Murakami

[11] Patent Number: 4,952,093

[45] Date of Patent: Aug. 28, 1990

[54] FASTENING DEVICE OF A PIPE SHAFT AND OF A HOLLOW SQUARE SHAFT, AND THEIR FASTENINGS FOR USE IN A BUSINESS MACHINE AND OTHER INDUSTRIAL MACHINES

[76] Inventor: Yokiyoshi Murakami, 11-16, Minamiurawa 3-chome, Urawa City, Saitama Prefecture, Japan

[21] Appl. No.: 368,998

[22] Filed: Jun. 16, 1989

[51] Int. Cl.$^5$ ............................................... B25G 3/00
[52] U.S. Cl. ................................... 403/261; 403/326; 403/379; 411/517
[58] Field of Search ............... 403/326, 379, 261, 104; 411/517

[56] References Cited

U.S. PATENT DOCUMENTS

| | | | |
|---|---|---|---|
| 1,296,042 | 3/1919 | Bralove | 403/379 |
| 2,026,454 | 12/1935 | Benzig | 403/261 X |
| 2,484,401 | 10/1949 | Coie | 403/379 X |
| 3,953,138 | 4/1976 | Hine | 403/104 X |
| 4,558,893 | 12/1985 | Shelly | 403/104 X |

FOREIGN PATENT DOCUMENTS

| | | | |
|---|---|---|---|
| 1296872 | 11/1972 | United Kingdom | 411/517 |
| 2097504 | 11/1982 | United Kingdom | 411/517 |

Primary Examiner—Andrew V. Kundrat
Attorney, Agent, or Firm—Wenderoth, Lind & Ponack

[57] ABSTRACT

A fastening for mounting on a pipe shaft or hollow polygonal cross-sectional shaft for use in a business machine or other industrial machine to hold an element on the shaft. The fastening has a ring having a gap at a peripheral portion, the portions of the ring on opposite sides of the gap being a pair of holding arms extending peripherally toward the gap, the holding arms having the ends opposed to each other and spaced slightly less than the diameter of the pipe and positioned a little past a diameter through the center of the ring and perpendicular to a diameter extending through the gap. Each holding arm has a curved holding surface at the end thereof on the inside of the ring for intimate engagement with the shaft. An insert integral with the ring at a portion diametrically opposite the gap extends radially inwardly of the ring from the inner periphery of the ring and toward the gap, and a pair of shoulders on the inner periphery of the ring, one on each side of the insert, engage the outer surface of the shaft. When the ring is positioned on the shaft, the insert extends through a small hole and tightly engages the inner surface of the shaft.

7 Claims, 3 Drawing Sheets

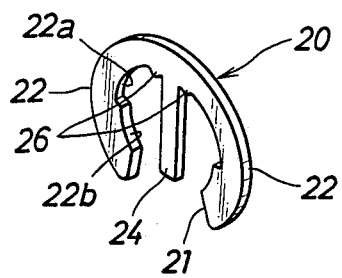
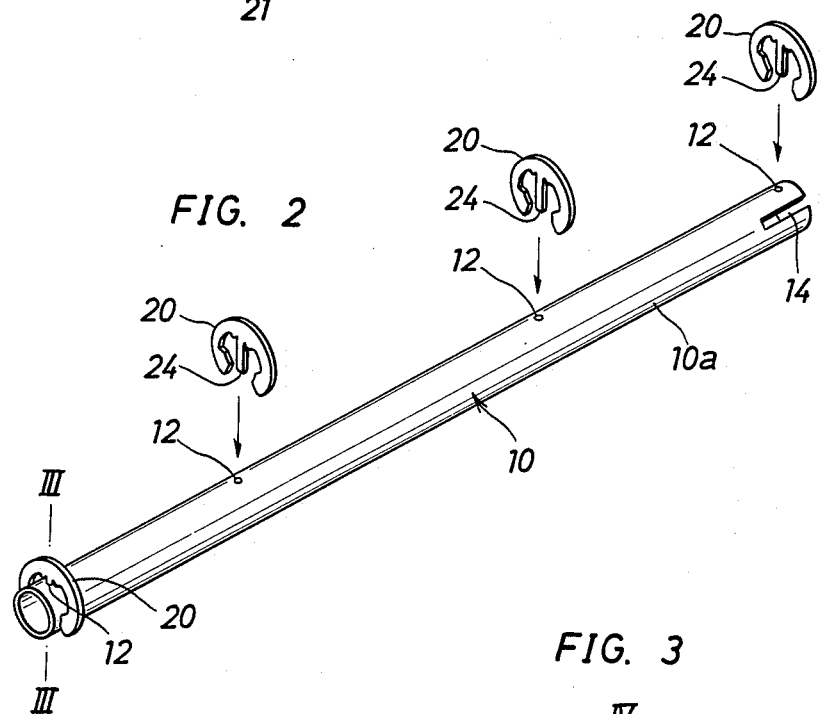
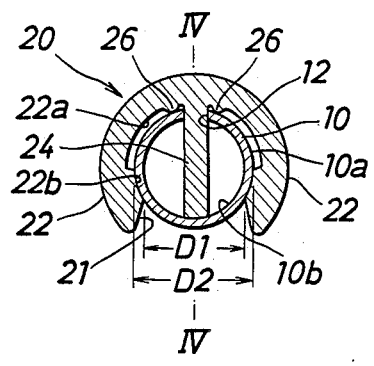

$$\ell = \ell 1 - 2(1/2\, t)$$

FASTENING DEVICE OF A PIPE SHAFT AND OF A HOLLOW SQUARE SHAFT, AND THEIR FASTENINGS FOR USE IN A BUSINESS MACHINE AND OTHER INDUSTRIAL MACHINES

BACKGROUND OF THE INVENTION

1. Field of the Invention

The present invention relates to a fastening device for use on a pipe shaft and a hollow square shaft for use in a business machine and other industrial machines.

2. Description of the Prior Art

It has been the practice to use a solid shaft 2, as shown in FIG. 12, for a paper feed shaft of a business machine and other industrial machines.

A snap ring groove 2a for receiving a snap ring for positioning an element on the shaft can be peripherally formed around the circumference of the solid shaft 2, and a stop 3 can be fitted into the snap ring groove 2a in order to secure the desired elements such as gears and rollers thereon.

It has been proposed in such a business machine and other industrial machines to use a pipe shaft 4, as shown in FIG. 13, in order to decrease the weight or to save material. The wall thickness of the pipe shaft 4, however, is so thin that it is difficult to form a snap ring groove 4a, into which a ring 5 can be fitted.

In order to overcome the aforementioned disadvantages, the pipe shaft 4 is subjected to cold working to form an upset portion for forming a snap ring groove 4a.

But work hardening is likely to occur in the snap ring groove 4a which is characteristic in chrome steel, cracks are sometimes caused, and there is danger of bringing about a cutting of the metal fibers, so that the pipe shaft may break after a period of use.

In addition, when a displacement force is given to the parts such as rollers, they are likely to be moved or shaken.

Although a bearing for securing the parts may be easily provided at an end portion of a hollow square shaft, it is extremely difficult to mount a bearing at the middle portion of such a hollow square shaft.

BRIEF SUMMARY OF THE INVENTION

It is the primary object of the present invention to provide a fastening for use on a pipe shaft and a hollow polygonal, e.g. square, shaft for use in a business machine such as a personal computer or a copying machine or other industrial machines whereby desired parts can be accurately and easily positioned on the shafts and rigidly mounted thereon.

Another object of this invention is to provide a fastening for use on a pipe shaft and a hollow square shaft for use in a business machine or other industrial machine, the fastening comprising a ring having a notch or gap and a pair of holding arms, an insert integrally provided at a top middle portion of the ring which is opposite to the notch or gap and which extends radially toward the notch or gap, and a pair of shoulders integrally provided on the inner periphery and on either side and near the neck portion of the insert respectively, whereby the shafts can be elastically and firmly held by the holding arms for rigidly mounting the desired parts on the shafts.

Another object of this invention is to provide a fastening for use on a pipe shaft for use in a business machine or other industrial machines whereby the pipe shaft can be radially and rigidly held by, the tensile strength of an insert radially provided at a top middle portion of the ring which is opposite to the notch and which extends radially toward the notch of the ring to extend into the inner periphery of the pipe and by the two shoulders provided integrally on the inner periphery and on either side and near the neck portion of the insert respectively.

Another object of this invention is to provide a fastening for use on a pipe shaft for use in a business machine which comprises a ring having a notch and a pair of holding arms, an insert integrally provided at a top middle portion of the ring which is opposite to the notch and which extends radially toward the notch and a pair of shoulders provided integrally on an inner periphery of the ring and on either side and near the neck portion of the insert, the lower half portion of the insert being twisted at an angle of 90° so as to be parallel to the longitudinal direction of the pipe shaft whereby the pipe shaft can be strongly supported and firmly held.

Another object of this invention is to provide a fastening for use in a pipe shaft and a hollow square shaft for use in a business machine whereby the pipe and hollow shafts which are rigidly provided with the parts such as the gears and rollers can be easily and securely rotated.

Another object of this invention is to provide a fastening for use in a pipe shaft and a hollow square shaft for use in a business machine whereby the parts rigidly mounted on these shafts are not moved or shaken at all even when a displacement force is longitudinally applied to them.

Another object of this invention is to provide a fastening for use in a pipe shaft and a hollow square shaft for use in a business machine whereby a plurality of circular openings, each having a small diameter, are provided radially at the desired positions along the length of these pipes in order to firmly hold an insert of the fastening respectively.

Another object of this invention is to provide a fastening for use in a pipe shaft and a hollow square shaft for use in a business machine whereby the physical strength of the pipe shaft or the hollow square shaft is not reduced.

Still another object of this invention is to provide a fastening for use in a pipe shaft and a hollow square shaft for use in a business machine whereby the light, but strong pipe and square shafts can be easily and economically produced.

BRIEF DESCRIPTION OF THE DRAWINGS

An embodiment of a fastening device of a pipe shaft and a hollow square shaft, and their fastenings is described in detail below with reference to the drawings, which illustrates only one specific embodiment in which:

FIG. 1 is an enlarged perspective view of a fastening for use in a business machine;

FIG. 2 is a perspective view showing a plurality of the fastenings shown in FIG. 1 engaged with a pipe shaft;

FIG. 3 is an enlarged transverse sectional view taken along line III—III of FIG. 2;

DETAILED DESCRIPTION OF THE PREFERRED EMBODIMENT

Figure 4:
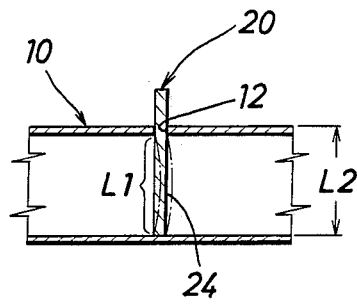
FIG. 4 is an enlarged sectional view taken along line IV—IV of FIG. 3.

Referring now generally to the drawings in which like reference characters represent like elements, there is shown in FIGS. 1 and 2 a pipe shaft 10 for use in a business machine and constructed of a seam welded stainless steel (AISI 304) having a hardness of HV 200°, a desired length, thickness and diameter. A longitudinal slit 14 is provided at an end portion of the pipe shaft 10 for insertion of a bearing. If desired, the pipe shaft 10 can be made of common steel or high tensile strength steel.

As particularly shown in FIG. 2, a plurality of openings 12, each having a small diameter, are provided radially through the pipe wall, and spaced longitudinally along the pipe shaft 10. Each opening 12 permits integral fitting of an insert 24 of a fastening 20 which is explained in detail in the following paragraph. The openings 12 through the pipe wall are positioned at the positions where the parts are desired to be mounted.

The ring-shaped fastening 20 is made of high tensile strength steel, and it comprises a ring having a notch or gap 21 and a pair of holding arms 22 extending toward the notch, each holding arm 22 including a concave portion having an arc-shaped surface portion 22b for engaging the outer periphery 10a of the pipe shaft 10. The inner periphery 22a of the ring-shaped fastening 20 is a little larger than the outer diameter ($D_2$) of the pipe shaft 10.

An insert 24 is integrally and radially provided at a top middle portion of the ring diametrically across from notch 21 and extends toward the notch 21. The length $L_1$ of the insert 24 is equal to or a little longer than the inner diameter ($D_1$) of the pipe shaft 10.

A pair of shoulders 26 is integrally provided on the inner periphery 22a of the ring and on each side and near the neck portion of the insert 24.

The two holding arms 22 extend downwardly a little lower than the center of the ring so that the arms can hold the outer periphery 10a of the shaft 10 firmly.

The sectional shape of the insert is rectangular so that the insert will be rigidly held on the pipe shaft 10 when it is inserted into the opening 12 for engagement with the shaft 10. A lower portion of the insert 24 is brought into contact with the inner periphery 10b of the pipe shaft 10, thus holding the fastening 20 on the shaft 10.

The length $L_1$ of the insert 24 is according to the following expression $$L_1 \geqq L_2$$

wherein $L_2$ is the inner diameter of the pipe shaft 10 plus the thickness of the pipe wall thereof.

Accordingly, the insert 24 is brought into contact with the inner periphery 10b and urged thereagainst the two concave portions 22b which have been spread slightly as the insert is inserted in the hole 12 and then the two shoulders 26 contact the outer periphery 10a after they pass the opposed side portion of the pipe.

Figure 5:
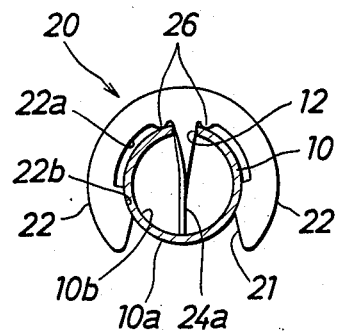
FIG. 5 is a front elevation, partly in section, of a pipe shaft, illustrating another embodiment of the fastening shown in FIGS. 1–4, wherein a lower half portion of an insert is twisted at an angle of 90° so as to be parallel to the longitudinal axis of a pipe shaft.

Another embodiment of the fastening is shown in FIG. 5, wherein a lower half portion 24a of the insert 24 is twisted at an angle of 90° so that it is parallel to the longitudinal direction of the pipe shaft 10, thus providing a strong holding force so as to cause the fastening to hold the pipe shaft 10 firmly.

Figure 8:
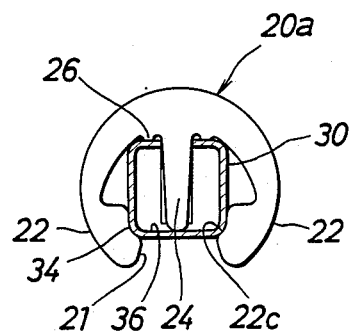
FIG. 8 is a front elevation, partly in section, of a hollow square shaft with a modified fastening according to this invention mounted thereon.

In FIG. 8, another embodiment of the fastening 20a is shown, wherein a hollow polygonal cross-section pipe, here shown as a hollow square pipe 30, is firmly held in the fastening 20a. To this end, the concave portions on holding arms 22 each have an angular portion 22c to permit an intimate engagement with and holding of an angular cross-section portion 34 of the square shaft 30, and the lower end portion of the insert 24 is brought into contact with the inner periphery 36 of the square shaft 30 for tight engagement therewith.

The use of the fastening of the invention will be explained with reference to an embodiment wherein the pipe shaft is used as a paper feed shaft. A plurality of openings 12 are provided longitudinally and in a row along and extending radially through the wall of the pipe shaft 10. These openings are provided at each end portion and also at the positions where the parts are to be mounted.

For mounting, the lower end portion of the insert 24 of the fastening 20 is partially inserted into the opening 12 of the pipe shaft 10 and the holding arms 22 are being elastically spread slightly, and then the fastening 20 is pushed forcedly into the pipe shaft.

As a result, the concave portions 22b of the holding arms 22 are resiliently brought together and tightly brought into contact with the outer periphery 10a of the pipe shaft 10 in such a manner that more than half of the periphery 10a is held, the distance D1 between the end portions of the holding arms 22 being less than the outer diameter D2 of the pipe shaft 10. The fastener is thus held on the pipe shaft 10 strongly and securely by the resilient engagement of the arms 22 against the pipe shaft.

In addition, the twisted lower half portion 24a of the insert 24 is parallel to the longitudinal direction of the pipe shaft 10 so that even when a displacement force is longitudinally applied to the pipe shaft 10, the twisted lower half portion 24a works in parallel to the pipe shaft 10 so as to bring about strong elastic support.

As explained in the foregoing paragraph, the lower end portion of the insert 24 is brought into contact with the inner periphery 10b of the pipe shaft 10. The length $L_1$ of the insert 24 is equal to or a little longer than the length $L_2$ of an inner diameter of the pipe shaft 10 plus the thickness of the pipe wall thereof. This is expressed by $L_1 \geq L_2$.

Accordingly, a strong force of the insert against the inner periphery of the pipe is obtained due to the rigidity of the insert 24 which is held against the inner periphery 10b of the pipe shaft 10 by elastic support of the holding arms 22 against the outer periphery of the pipe.

The holding force obtained by the holding arms 22 is also exerted on the pipe by the two shoulders provided on the inner periphery 22a and near the neck portion of the insert 24 so that high securing force can be effectively obtained.

As shown in FIG. 5, the lower half portion 24a of the insert 24 is twisted at an angle of 90° so as to be parallel to the longitudinal direction of the pipe 10. As a result, the twisted portion 24a of the insert 24 can bring about strong support even when a displacement force is longitudinally applied to the parts.

Figure 9:
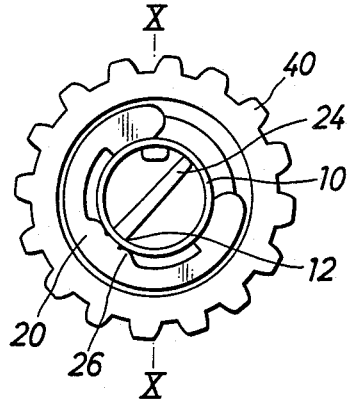
FIG. 9 is a front elevation of a pipe shaft which is provided with a gear having a fastening according to this invention.
Figure 10:
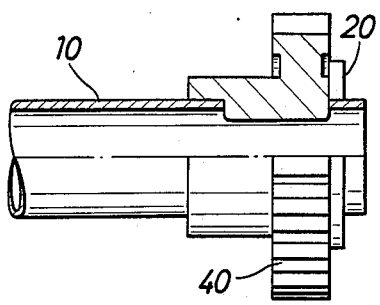
FIG. 10 is a side elevation, partly in section, of the hollow square shaft shown in FIG. 9, taken along line X—X of FIG. 9.
Figure 11:
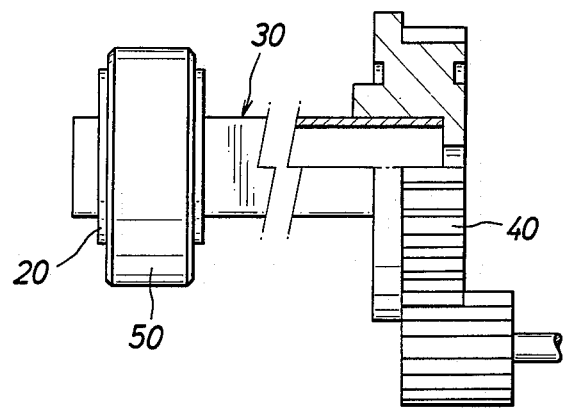
FIG. 11 is a side elevation, partly in section, of a hollow square shaft such as is shown in FIG. 8, which is provided with a gear and a roller held on the shaft by a fastening according to this invention.
Figure 12:
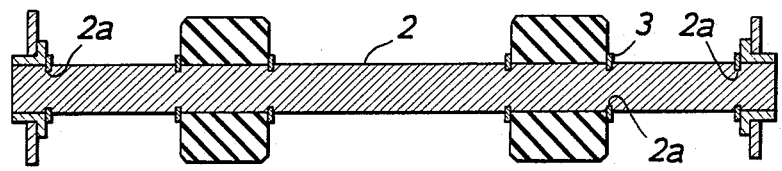
FIG. 12 is a longitudinal sectional view of a conventional solid shaft having rollers held by snap rings fitted into grooves therein.
Figure 13:
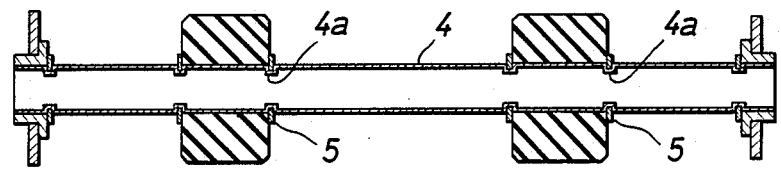
FIG. 13 is a longitudinal sectional view of a conventional pipe shaft provided with a pair of rollers held by snap rings fitted into grooves in the pipe shaft formed by cold working.

The parts such as gears 40 and rollers 50 can be tightly held on the pipe shaft 10 by the present ring-shaped fastening 20 as shown in FIGS. 9-11, and displacement or shaking of the parts can be prevented even when a displacement force is longitudinally applied to them.

Figure 6:
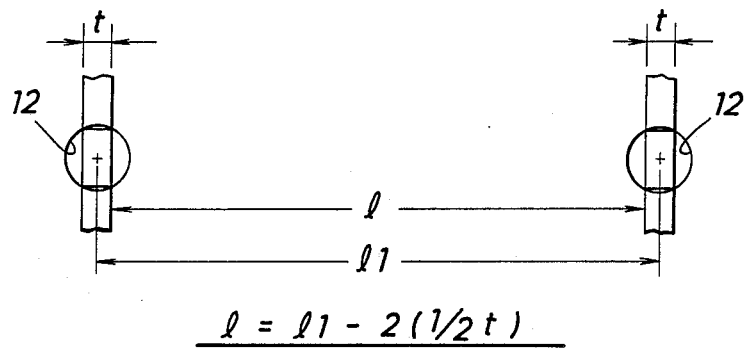
FIG. 6 is a diagrammatic plan view illustrating a spacing between a pair of small openings radially provided through the circumference of a pipe shaft.
Figure 7:
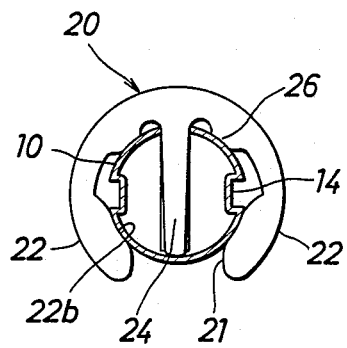
FIG. 7 is an enlarged elevation view, partly in section, of another embodiment of a fastener according to the invention mounted on a pipe shaft having a pair of rectangular grooves provided longitudinally on opposite portions thereof.

In production, a plurality of the radially extending circular openings, each having a small diameter, are provided in a row so that the positioning of these openings 12 can be easily carried out according to the following expression (see FIG. 6)

$$l = l_1 - 2(\tfrac{1}{2}t)$$

wherein $l_1$ is the distance between the centers of the neighboring openings 12, t is the thickness of the insert 24 and l is the distance between the neighboring inserts 24.

The present pipe shaft 10 and the fastening 20 can be manufactured easily and economically, and the physical strength of the pipe shaft 10 is not only reduced, but the pipe shaft 10 will not be broken.

Moreover, machining each of the openings 12 through the pipe shaft 10 or through the hollow square shaft 30 can be carried out by a press, by drilling or by a laser without reducing the strength of these shafts.

With the conventional pipe shaft, it has been impossible to hold the parts firmly on the pipe shaft 10, but the fastening 20 of this invention enables economical mounting of the parts rigidly on the pipe shaft 10. The weight of the pipe shaft 10 can also be decreased as compared with a solid shaft.

With the fastening 20 of this invention, it is possible to mount the bearing and the parts even at the middle portion of the pipe shaft 10.

While the present invention has been described with respect to a preferred embodiment, it is to be understood that the invention is not limited thereto but may be otherwise embodied within the scope of the following claims.

What is claimed is:

1. A fastening for mounting on a pipe shaft or hollow polygonal cross-sectional shaft for use in a business machine or other industrial machine to hold an element on the shaft, which shaft has a length, a thickness and a diameter and having at least one small diameter radially extending circular opening, said fastening comprising:
a ring having a gap at a peripheral portion, the portions of said ring on opposite sides of said gap being a pair of holding arms extending peripherally toward said gap, said holding arms having the ends opposed to each other and spaced slightly less than a diameter of a pipe onto which the fastener is to be placed and positioned a little past a diameter through the center of said ring and perpendicular to a diameter extending through said gap, each holding arm having a curved holding surface at the end thereof on the inside of said ring for intimate engagement with a shaft, an insert integral with said ring at a portion diametrically opposite said gap and extending radially inwardly of said ring from the inner periphery of said ring and toward said gap, a pair of shoulders on the inner periphery of said ring, one on each side of said insert, said insert having a length for, when said ring is positioned on a pipe shaft or hollow polygonal cross-section shaft with said insert through a small diameter circular opening therein and said shoulders and curved holding surfaces are engaged with the outer surface of the shaft, tightly engaging the inner surface of the shaft.

2. A fastener as claimed in claim 1 in which the free end of said insert is twisted ninety degrees to the remainder of said insert.

3. In combination,
a hollow shaft having a circular or polygonal cross-section for use in a business machine or other industrial machine, and having a length, a thickness and an outer and inner diameter, and having at least one small diameter radially extending circular opening therein along the length of said shaft; and
a fastening mounted on said shaft for holding an element on said shaft, said fastening comprising:
a ring having a gap at a peripheral portion, the portions of said ring on opposite sides of said gap being a pair of holding arms extending peripherally toward said gap, said holding arms having the ends opposed to each other and spaced slightly less than the outside diameter of said shaft onto which the fastener is to be placed and positioned a little past a diameter through the center of said ring and perpendicular to a diameter extending through said gap, each holding arm having a curved holding surface at the end thereof on the inside of said ring for intimate engagement with the outer surface of said shaft, an insert integral with said ring at a portion diametrically opposite said gap and extending radially inwardly of said ring from the inner periphery of said ring and toward said gap, a pair of shoulders on the inner periphery of said ring, one on each side of said insert, said ring being on said shaft with said insert through said small diameter circular opening therein and said shoulders and curved holding surfaces engaged with the outer surface of the shaft, and the free end of said insert tightly engaging the inner surface of the shaft.

4. The combination as claimed in claim 3 in which said insert has a length $L_1$ equal to or greater than the inner diameter of said shaft plus the thickness of said shaft.

5. The combination as claimed in claim 3 or 4 in which the free end of said insert is twisted ninety degrees to the remainder of said insert so as to be parallel to the longitudinal axis of said shaft.

6. The combination as claimed in claim 3 or 4 in which said shaft has a longitudinal slit in at least one end thereof.

7. The combination as claimed in claim 3 or 4 in which there is a plurality of said circular openings spaced along the length of said shaft, and a plurality of said fastenings each having the insert thereof in one of said circular openings.

* * * * *